March 16, 1971  G. E. GOLLWITZER  3,570,093
METHOD OF MAKING A WHEEL RIM
Filed Jan. 6, 1969  2 Sheets-Sheet 1
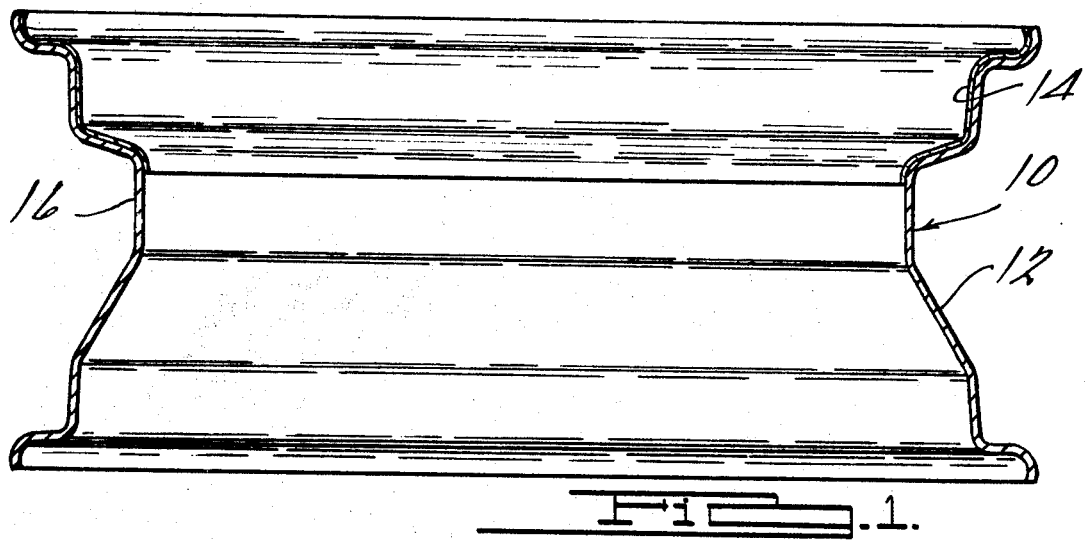
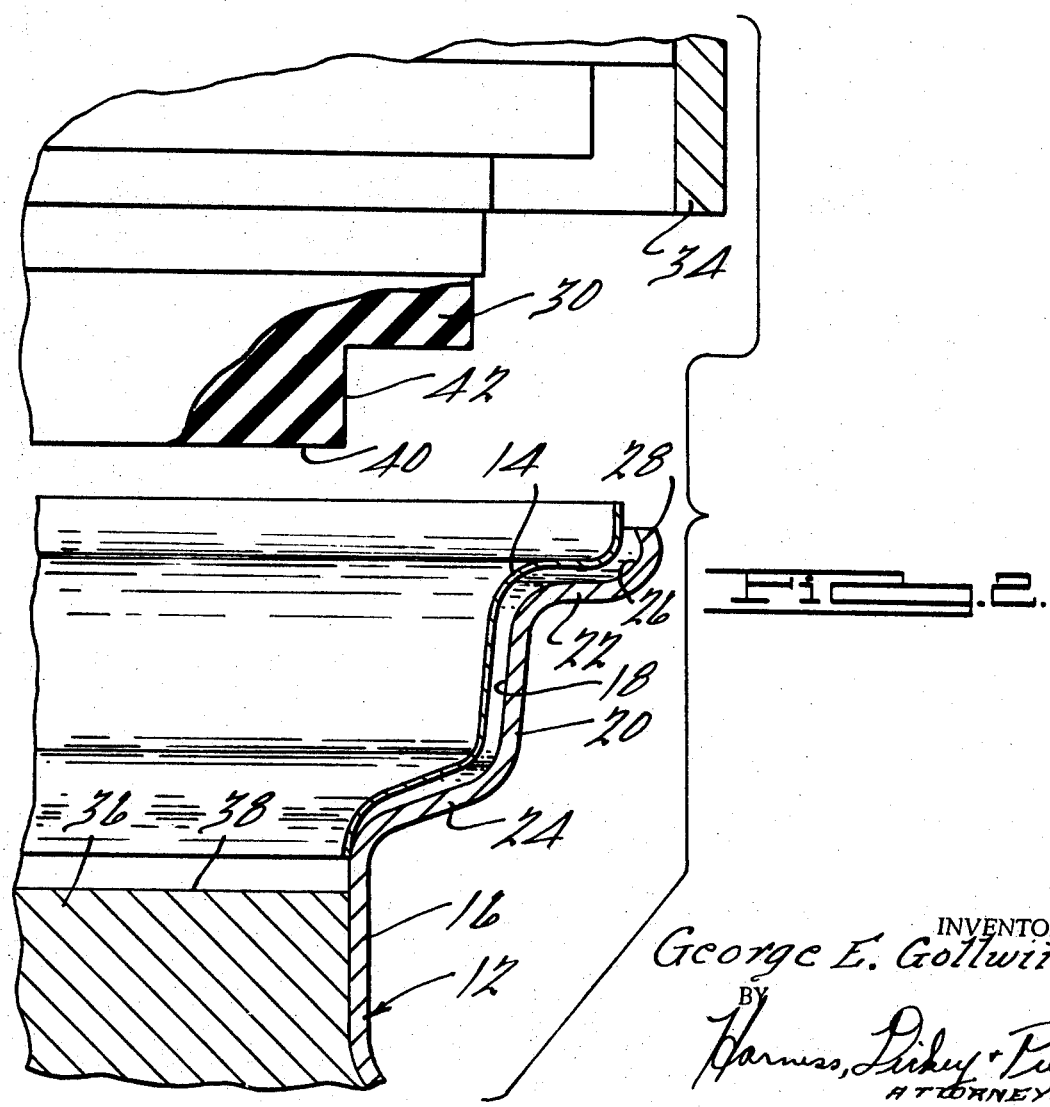
INVENTOR.
George E. Gollwitzer
BY
Harness, Dickey & Pierce
ATTORNEYS March 16, 1971 G. E. GOLLWITZER 3,570,093
METHOD OF MAKING A WHEEL RIM
Filed Jan. 6, 1969 2 Sheets-Sheet 2
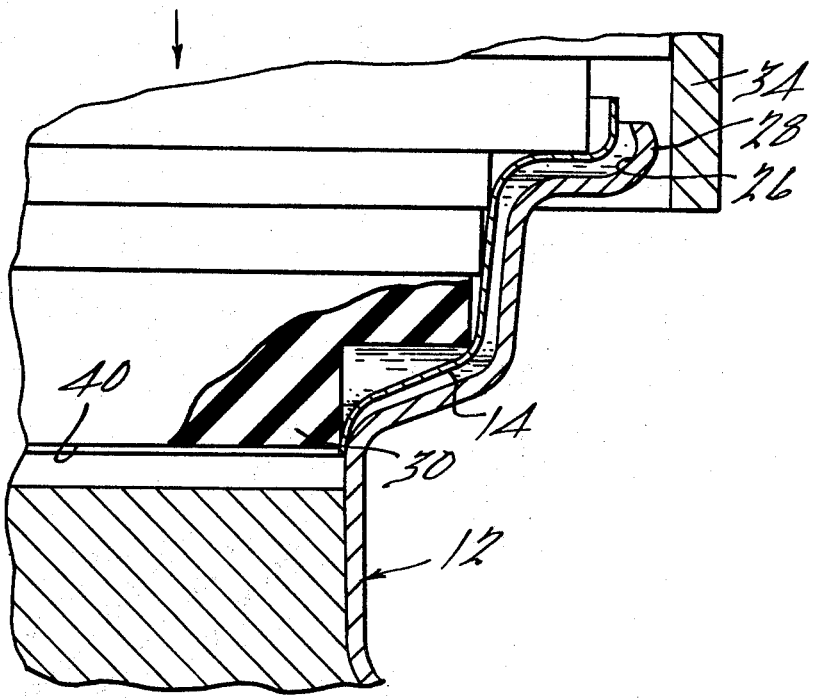
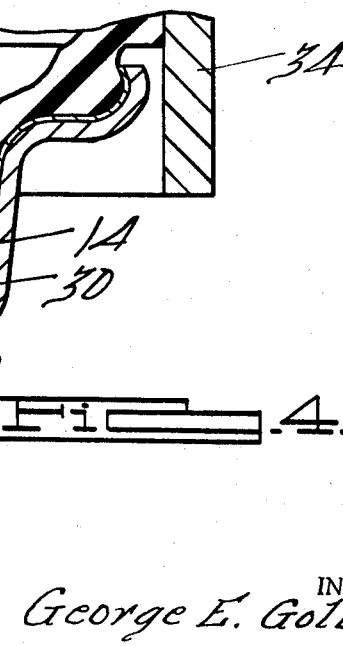
INVENTOR.
George E. Gollwitzer
BY
Harness, Dickey & Pierce
ATTORNEYS.

United States Patent Office 3,570,093
Patented Mar. 16, 1971

3,570,093
METHOD OF MAKING A WHEEL RIM
George E. Gollwitzer, Belleville, Mich., assignor to
Kelsey-Hayes Company, Romulus, Mich.
Filed Jan. 6, 1969, Ser. No. 789,256
Int. Cl. B21h *1/10;* B21k *1/38*
U.S. Cl. 29—159.1    7 Claims

ABSTRACT OF THE DISCLOSURE

A wheel rim and method of making the same in which the rim is provided with a decorative facing of alumnium or other bright material. The facing, which is in ring form, is attached to the rim by use of a rubber bulging die.

SUMMARY OF THE INVENTION

A demand exists within the automobile industry for automobile rims having a bright exterior surface appearance. In the past such a surface appearance has been produced by chrome plating conventional steel rims. Chrome plating procedures are, however, relatively expensive and chrome is subject to corrosion and other deterioration during use. The present invention is directed to a wheel rim construction and method for making same in which a separate annular ring of relatively thin but flat, bright material is applied to the exposed surface of a conventional steel rim. The ring may be made of aluminum or various other materials having a lower yield point than the steel utilized in the rim itself. The materials which inherently possess such bright appearance are much more costly than the steel used for rim and, accordingly, it would be highly impractical from a cost standpoint to manufacture the entire rim from the bright material.

The method of attachment of the facing ring to the rim consists of radially expanding the ring beyond its elastic limits and so that it takes a new set. During such expansion the facing ring is brought into intimate conforming engagement with the surface of the rim to be covered. The rim itself is stretched radially outwardly, but when the expanding forces are removed, the rim will spring back to substantially its original size due to its greater elasticity and higher yield strength. As a result, the rim grips the facing ring and applies a compressive loading to it which holds the ring and rim in intimate contact and prevents relative rotation or movement of the facing ring with respect to the rim. The rim which is thus produced has a desirable ornamental appearance, is durable in construction, and may be manufactured at a fraction of the cost of a chrome plated steel rim.

DESCRIPTION OF THE VIEWS OF THE DRAWINGS

FIG. 1 is a sectional view of a wheel rim emboding the principles of the present invention;

FIG. 2 is a view of the rim of FIG. 1 during one stage of its manufacture, the view also showing the die apparatus for joining several parts of the rim; and FIGS. 3 and 4 are views of the structure illustrated in FIG. 2, showing subsequent stages in the manufacturing process.

DETAILED DESCRIPTION OF THE PREFERRED EMBODIMENT

FIG. 1 illustrates a composite wheel rim designated generally by the number 10, which consists of a steel rim 12 and a decorative facing ring 14 joined to the rim 12. The steel rim 12 has the usual drop center 16 and the facing ring 14 is located on one side of the drop center and conformably engages the inner periphery 18 of a portion of the rim 12 defined by a bead seat 20, a tire retaining flange 22, and a sloping wall 24 extending from the drop center 16 to the bead seat 20. A portion of the facing ring 14 lies within an arcuate groove 26 defined by a reversely bent terminal portion 28 of the flange 22.

The facing ring 14 is joined to the rim 12 solely by the frictional interengagement of the parts and stresses developed by the interference fit between the parts. This fit and the gripping of the ring 14 by the rim 12 is achieved as a result of an expansion of the parts through the die mechanism illustrated in FIGS. 2 through 4.

The die structure of FIGURES 2 through 4 includes a rubber bulging die member 30 which is supported for vertical movement with an enclosing rigid sleeve 34. A fixed platen 36 is positioned within the drop center 16 of the rim 12, and has an upper surface 38 which is engaged by a lower surface 40 of the bulging die 30. The bulging die 30 has a stepped outer periphery 42 which is contoured only approximately to the configuration of the inner periphery 18 of the rim 12.

The steps in the manufacture of the wheel rim 10 include, first, the formation of the rim 12 to the desired size and shape. This is achieved by a conventional rim rolling and welding operation, which is well known in the art. Next, the ring 14 is formed to a configuration approximating the inner periphery 18 of the portion of the rim 12 which it is desired to cover. However, the facing ring 14 initially possesses a diameter slightly less than the corresponding diameters of the inner periphery 18 of the rim 12. The facing ring 14 is then inserted in the rim 12 and said parts are inserted in the die mechanism illustrated in FIG. 2. Preferably, the steel rim 12 is painted and dried prior to assembly. The bulging die member 30 and sleeve 34 are then moved downwardly under power. The die member 30 will first contact the ring 14 as shown in FIG. 3. Upon further downward movement the die member 30 will be compressed between the platen 36 and the press ram (not shown) on which it is mounted, and expand radially outwardly into intimate conforming engagement with the ring 14. This causes the ring 14 to expand radially outwardly into intimate conforming engagement with the inner periphery 18 of the rim 12 as shown in FIG. 4. The radial forces produced by the die member 30 radially expand both the ring 14 and rim 12. The ring 14 is stretched beyond its elastic limits and takes a new set. Aluminum has a yield point which is (in some instances) only about one-third that of steel and if the ring 14 is made of aluminum while the rim 12 is made of steel the ring will take a new set long before the rim. It will also be appreciated that the material of the facing ring 14 is relatively thin and readily workable compared to the thicker rim 12. Accordingly, the configuration of the rim 12 will establish the end configuration of the parts and the ring 14 will conform to the rim 12. The rim 12 is only expanded within its elastic limits. Therefore, when the bulging die 30 is withdrawn, the rim 12 will contract to its original size and the inner periphery 18 of the rim 12 will grip the facing ring 14 which does not contract to the same degree. The resulting stresses in the rim 12 and ring 14 will produce sufficient friction between the parts to firmly lock them together. The ring 14 is compressively stressed while the rim 12 is under tension. In addition, the expansion of the ring 14 into the groove 26 provides a positive mechanical lock against axial movement of the ring 14 away from the rim 12.

The operation of the bulging die 30 is such as to cause its outer periphery 42 to conform to the configuration of the surrounding material which it is to work. The elastomeric material of the die 30 almost flows like hydraulic fluid. In will be seen that the sleeve 34 confines the material of the die 30 above the parts to be worked and limits expansion of the die to the desired area.

A conventional wheel disk or body (not shown) may be attached to the wheel rim 10 subsequent to the manufacturing operation illustrated and described herein. While the materials of the rim 12 and ring 14 which have been suggested herein are steel and aluminum, respectively, it will be apparent that various other materials and alloys having similar characteristics could be utilized. It is only necessary that the ring 14 be made from a material possessing a lower yield point than the rim 12.

What I claim is:

1. The method of manufacturing a wheel rim having a decorative facing comprising the steps of forming a rim to the approximate desired size and shape, inserting within said rim a decorative facing ring made from material having a lower modulus of elasticity than the material of said rim, radially expanding said ring and said rim to force said ring into intimate conforming engagement with said rim and stretch said ring beyond its elastic limits whereby upon the removal of the expanding forces, said rim will contract into stressed gripping engagement with said ring.

2. The method set forth in claim 1 in which the radial expansion of said ring and rim is accomplished by an elastomeric bulging die.

3. The method set forth in claim 2 in which said rim is not stretched beyond its elastic limits.

4. The method of manufacturing a wheel rim having a decorative facing comprising the steps of forming a rim to the approximate desired size and shape, inserting within said rim a decorative facing ring made from material having a lower yield point than the material of said rim, radially expanding said ring and said rim to force said ring into intimate conforming engagement with said rim and stretch said ring beyond its elastic limits whereby upon the removal of the expanding forces, said rim will contract into stressed gripping engagement with said ring.

5. The method set forth in claim 4 in which said rim is not stretched beyond its elastic limits.

6. The method of manufacturing a wheel rim having a decorative facing comprising the steps of forming a rim to the approximate desired size and shape, inserting within said rim a decorative facing ring made from material having a lower modulus of elasticity than the material of said rim and with said rim outwardly unrestrained, radially expanding said ring and said rim to force said ring into intimate conforming engagement with said rim and stretch said ring beyond its elastic limits whereby upon the removal of the expanding forces, said rim will contract into stressed gripping engagement with said ring.

7. The method set forth in claim 6 in which said rim is not stretched beyond its elastic limits.

References Cited

UNITED STATES PATENTS

| | | | |
|---|---|---|---|
| 1,985,378 | 12/1934 | Lyon | 301—37 |
| 2,304,581 | 12/1942 | Lyon | 29—200 |
| 2,304,582 | 12/1942 | Lyon | 29—159X |
| 2,337,247 | 12/1943 | Kepler | 29—446X |
| 3,039,826 | 6/1962 | Lyon | 301—37 |
| 3,064,344 | 11/1962 | Arne | 29—446X |

JOHN F. CAMPBELL, Primary Examiner

V. A. DI PALMA, Assistant Examiner

U.S. Cl. X.R.

29—421, 446, 523; 301—37